United States Patent
Tian et al.

(10) Patent No.: US 11,303,196 B2
(45) Date of Patent: Apr. 12, 2022

(54) APPARATUS FOR CONVERSION BETWEEN AC POWER AND DC POWER

(71) Applicant: ABB Schweiz AG, Baden (CH)

(72) Inventors: Kai Tian, Hebei (CN); Tinho Li, Hong Kong (CN); Kuenfaat Yuen, Hong Kong (CN); Mei Liang, Beijing (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/212,636

(22) Filed: Mar. 25, 2021

(65) Prior Publication Data

US 2021/0273552 A1    Sep. 2, 2021

Related U.S. Application Data

(63) Continuation of application No. PCT/CN2018/107978, filed on Sep. 27, 2018.

(51) Int. Cl.
  *H02M 1/14*    (2006.01)
  *H02M 5/458*   (2006.01)

(52) U.S. Cl.
  CPC ............ *H02M 1/14* (2013.01); *H02M 5/458* (2013.01)

(58) Field of Classification Search
  CPC ............ H02M 1/12; H02M 1/15; H02M 5/45; H02M 1/14; H02M 1/123; H02M 1/26;
  (Continued)

(56) References Cited

U.S. PATENT DOCUMENTS 7,518,891 B2   4/2009   Wei et al.
8,670,260 B2   3/2014   Wang et al.
(Continued)

FOREIGN PATENT DOCUMENTS

CN    101800483 A    8/2010
CN    106411121 A    2/2017
CN    107404218 A    11/2017

OTHER PUBLICATIONS

Intellectual Property Office of the P.R. China, International Search Report & Written Opinion issued in corresponding Application No. PCT/CN2018/107978, dated Jul. 1, 2019, 8 pp.

*Primary Examiner* — Adolf D Berhane
(74) *Attorney, Agent, or Firm* — Greenberg Traurig, LLP

(57) ABSTRACT

An objective of the present application is to provide an apparatus for conversion between AC power and DC power. The apparatus includes a first power conversion circuit having a first AC side and a first DC side, at least one second power conversion circuit each having a second AC side and a second DC side; and at least one choke having a first terminal, a second terminal and at least one third terminal, wherein the first terminal is arranged to be electrically coupled to a phase of the AC power, and the second terminal and the at least one third terminal are electrically coupled to respective same phases of the first AC side of the first power conversion circuit and the second AC side of the at least one second power conversion circuit. Moreover, the choke includes a first common-mode choke and a first differential-mode choke, wherein: the first common-mode choke and the first differential-mode choke are electrically coupled in series via a first group of coil ends of the first common-mode choke and a first group of coil ends of the first differential-mode choke, and a second group of coil ends of one of the first common-mode choke and the first differential-mode choke are electrically coupled to the first terminal of the choke, and a second group of coil ends of the other are respectively electrically coupled to the second terminal and the at least one third terminal of the choke. The first common-mode choke can help provide high inductance to the high-frequency components of the common-mode current, which flows from the AC power source, since the impedance of the common-mode choke and the differential- (Continued)

mode choke depends on frequency on the same scale as inductance. The advantages of using the common-mode choke is that it provides twice the inductance of separate inductor design due to the coupling effect. Therefore it filters the common-mode current more effectively or the inductance size can be reduced for a given current ripple requirement.

20 Claims, 5 Drawing Sheets

(58) Field of Classification Search
CPC ........ H02M 1/143; H02M 5/458; H02M 5/40; H02M 5/44; H02M 5/453; H02M 7/12; H02M 7/125; H02M 7/155; H02M 7/219
See application file for complete search history.

(56) References Cited

U.S. PATENT DOCUMENTS

| | | | |
|---|---|---|---|
| 9,166,491 B2 | 10/2015 | Wang et al. | |
| 10,784,678 B1* | 9/2020 | Xiong | H02H 9/007 |
| 2012/0106210 A1* | 5/2012 | Xu | H02M 1/126 |
| | | | 363/37 |
| 2021/0211037 A1* | 7/2021 | Tian | H02M 1/126 |
| 2021/0313873 A1* | 10/2021 | Yamamoto | H02M 1/123 |

* cited by examiner

APPARATUS FOR CONVERSION BETWEEN AC POWER AND DC POWER

TECHNICAL FIELD

The invention relates to conversion between AC power and DC power, and more particularly to AC sides of power conversion circuits are arranged for operation in parallel.

BACKGROUND ART

AC-DC converter is used widely for converting AC power to DC power, providing stable DC bus for feeding DC load or as a first stage in power converters providing DC input for other converters, like the first AC-DC stage in EV charger. In some applications, one DC bus is enough, while in other applications, multi separate DC buses are required.

U.S. Pat. No. 9,166,491 B2 discloses an interleaved converter with separate DC buses for AC-DC-AC power conversion. Besides separate inductors, an interphase transformer is used for suppressing circulating current in the interleaved converter.

BRIEF SUMMARY OF THE INVENTION

However, the solution according to U.S. Pat. No. 8,670,260 B2 has at least one technical disadvantage in that the size of the inductor is relatively big and its power loss is relatively high.

In order to solve at least one of the problems, it is therefore an objective of the invention to provide an apparatus for conversion between AC power and DC power. The apparatus includes a first power conversion circuit having a first AC side and a first DC side, at least one second power conversion circuit each having a second AC side and a second DC side; and at least one choke having a first terminal, a second terminal and at least one third terminal, wherein the first terminal is arranged to be electrically coupled to a phase of the AC power, and the second terminal and the at least one third terminal are electrically coupled to respective same phases of the first AC side of the first power conversion circuit and the second AC side of the at least one second power conversion circuit. Moreover, the choke includes a first common-mode choke and a first differential-mode choke, wherein: the first common-mode choke and the first differential-mode choke are electrically coupled in series via a first group of coil ends of the first common-mode choke and a first group of coil ends of the first differential-mode choke, and a second group of coil ends of one of the first common-mode choke and the first differential-mode choke are electrically coupled to the first terminal of the choke, and a second group of coil ends of the other are respectively electrically coupled to the second terminal and the at least one third terminal of the choke.

The first common-mode choke can help provide high inductance to the high-frequency components of the common-mode current, which flows from the AC power source, since the impedance of the common-mode choke and the differential-mode choke depends on frequency on the same scale as inductance. The advantages of using the common-mode choke is that it provides twice the inductance of separate inductor design due to the coupling effect. Therefore it filters the common-mode current more effectively or the inductance size can be reduced for a given current ripple requirement.

Preferably, the first common-mode choke has a leakage flux. The first common-mode choke has a leakage flux. The common-mode choke, in principle, does not provide inductance towards the differential-mode current between the interleaved legs due to the flux cancellation effect. However, the leakage inductance is acting in suppressing the differential-mode current between the interleaved legs together with the differential-mode choke. The leakage inductance of the common-mode choke help reduce the undesired differential-mode current ripple and spikes.

Preferably, the first common-mode choke has a first parasitic capacitive element and the first differential-mode choke has a second parasitic capacitive element. The leakage inductance and capacitance are acting in suppressing the differential-mode current between the interleaved legs together with the differential-mode choke. The leakage inductance and capacitance of the common-mode choke can help reduce the undesired differential-mode current ripple and spikes.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
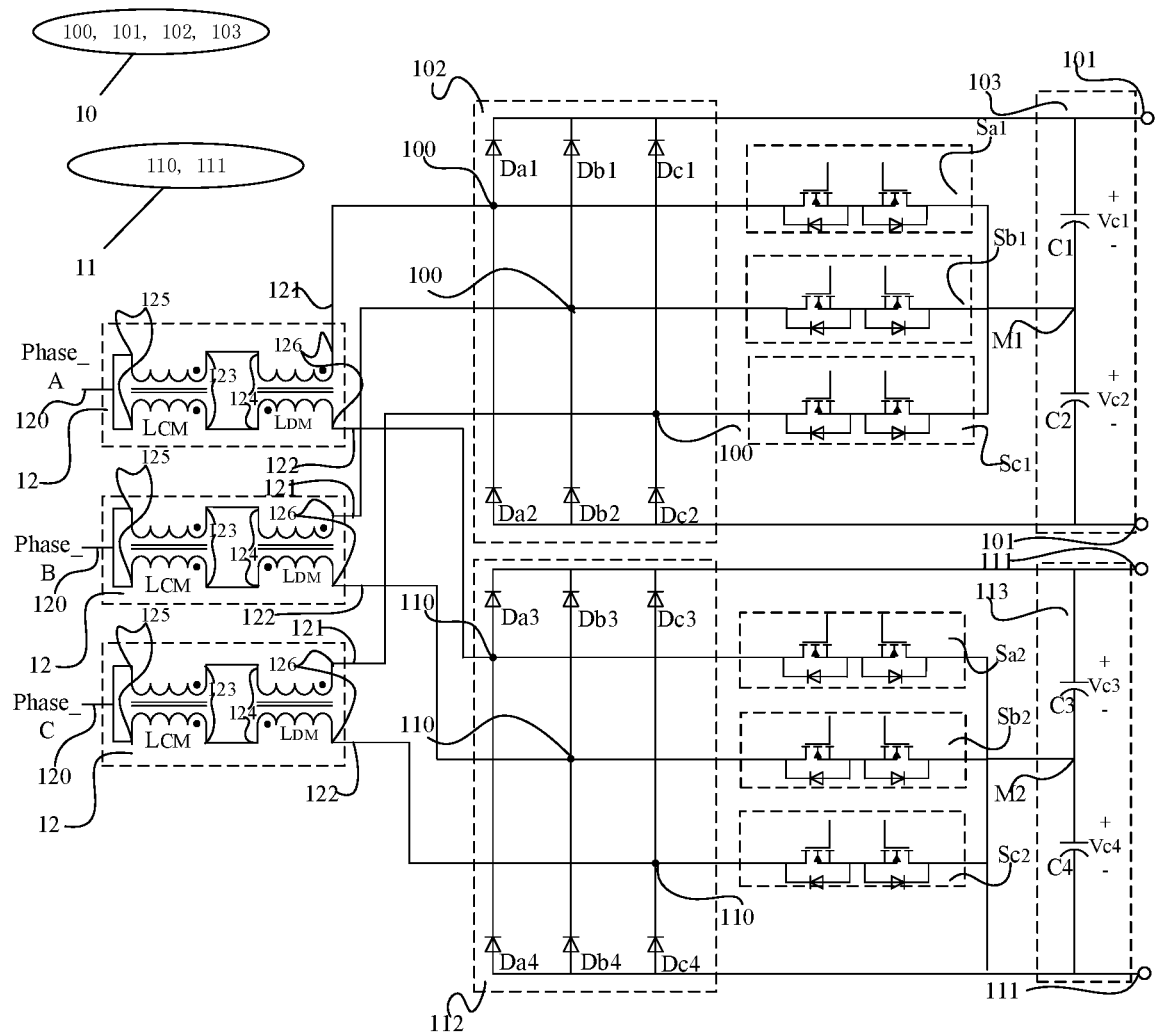
FIG. 1 illustrate apparatuses for conversion between AC power and DC power according to an embodiment of present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

Furthermore, note that the word "may" is used throughout this application in a permissive sense (i.e., having the potential to, being able to), not a mandatory sense (i.e., must).-" The term "include", and derivations thereof, mean "including, but not limited to". The term "connected" means "directly or indirectly connected", and the term "coupled" means "directly or indirectly connected". FIG. 1 illustrate apparatuses for conversion between AC power and DC power according to an embodiment of present invention. As shown in FIG. 1, the apparatus 1 can receive AC power at its AC side from an AC power source and convert the received AC power into DC power at its DC sides. The apparatus 1 includes a first power conversion circuit 10, at least one second power conversion circuit 11, at least one choke 12.

The first power conversion circuit 10 can use an AC to DC power conversion topology having a first AC side 100 and a first DC side 101. For example, the first power conversion circuit 10 may have a first rectifier 102 and a first capacitor bank 103. The first rectifier 102 is electrically coupled to the first AC side 100 and the first capacitor bank 103 is electrically coupled to the DC side 101. The first rectifier 102 may rectify a first AC power supplied from the AC power source, which in turn flows to the DC side 101 via the first capacitor bank 103. As shown in FIG. 1, the first rectifier 102 includes a plurality of diodes Da1-Da2, Db1-Db2 and Dc1-Dc2, arranged in a three-phase full bridge configuration. The mid-points respectively for the diodes Da1-Da2, diodes Db1-Db2 and diodes Dc1-Dc2 are electrically coupled to phase A, phase B and phase C of the first AC side 100 of the first power conversion circuit 10.

The at least one second power conversion circuit 11 each can use an AC to DC power conversion topology having a second AC side 110 and a second DC side 111. For example, the second power conversion circuit 11 may have a second rectifier 112 and a second capacitor bank 113. The second rectifier 112 is electrically coupled to the second AC side 110 and the second capacitor bank 113 is electrically coupled to the second DC side 111. The second rectifier 112 may rectify a second AC power supplied from the AC power source, which in turn flows to the second DC side 111 via the second capacitor bank 113. As shown in FIG. 1, the second rectifier 112 includes a plurality of diodes Da3-Da4, Db3-Db4 and Dc3-Dc4, arranged in a three-phase full bridge configuration. The mid-points respectively for the diodes Da3-Da4, diodes Db3-Db4 and diodes Dc3-Dc4 are electrically coupled to phase A, phase B and phase C of the second AC side 110 of the second power conversion circuit 11.

The first DC side 101 of the first power conversion circuit 10 and the second DC side 111 of the second power conversion circuit 11 are separate from each other, so that the first power conversion circuit 10 and the second power conversion circuit 11 can provide separate power flow paths to the respective first DC side 101 and second DC side 111.

In this embodiment, the first capacitor bank 103 has a first capacitive element $C_1$ and a second capacitive element $C_2$ electrically connected in series at a mid-point $M_1$, and the second capacitor bank 113 has a third capacitive element $C_3$ and a fourth capacitive element $C_4$ electrically connected in series at a mid-point $M_2$. For each of the phases A, B, C, the apparatus 1 further includes: a group of controllable bi-directional switches, one of which is inserted between the second terminal 121 of the corresponding choke 12 and the mid-point $M_1$ of first capacitor bank 103 electrically connecting the same and the other of which is inserted between the third terminal 122 of the corresponding choke 12 and the mid-point $M_2$ of second capacitor bank 113 electrically connecting the same. For example, with respect to phase-A, the controllable bi-directional switch $S_{a1}$ is arranged between the second terminal 121 of the choke 12 for phase-A and the mid-point $M_1$ of the first capacitor bank 103, and the switch $S_{a1}$ electrically coupled to both of them; and the other controllable bi-directional switch $S_{a2}$ is arranged between the third terminal 122 of the choke 12 for phase-A and the mid-point $M_2$ of the second capacitor bank 113, and the switch $S_{a2}$ electrically coupled to both of them. The same holds true for phase B and phase C, except that for phase B it concerns with the counterparts as of the group of controllable bi-directional switches $S_{b1}$, $S_{b2}$ and the choke 12 for phase-B, and for phase C it concerns with the counterparts as of the group of controllable bi-directional switches $S_{c1}$, $S_{c2}$ and the choke 12 for phase-C. Modulation of the converter is the same as normal interleaved converter with phase shift between the two interleaved legs.

In the operation under controlling the controllable bi-directional switches $S_{a1}$, $S_{a2}$, $S_{b1}$, $S_{b2}$, $S_{c1}$, $S_{c2}$ by the controller, tables I, II, and III respectively show the voltage and device states of the interleaved legs for phases A, B and C. $V_{c1}$, $V_{c2}$, $V_{c3}$ and $V_{c4}$ indicate the voltage across the first capacitive element $C_1$, the second capacitive element $C_2$, the third capacitive element $C_3$ and the fourth capacitive element $C_4$.

TABLE I

| Voltage across phase A of AC | Device states (1---conduct, 0---do not conduct) | | |
|---|---|---|---|
| side 100 and M1 | Sa1 | Da1 | Da2 |
| Vc1 | 0 | 1 | 0 |
| 0 | 1 | 0 | 0 |
| −Vc2 | 0 | 0 | 1 |

| Voltage across phase A of AC | Device states (1---conduct, 0---do not conduct) | | |
|---|---|---|---|
| side 110 and M2 | Sa2 | Da3 | Da4 |
| Vc3 | 0 | 1 | 0 |
| 0 | 1 | 0 | 0 |
| −Vc4 | 0 | 0 | 1 |

During the control, gating signals of $S_{a1}$ and $S_{a2}$ are interleaved. If $S_{a1}$ is on, $D_{a1}$ and $D_{a2}$ are off. If $S_{a1}$ is off, one of $D_{a1}$ and $D_{a2}$ conducts, depending on the direction of current. If $S_{a2}$ is on, $D_{a3}$ and $D_{a4}$ are off. If $S_{a2}$ is off, one of $D_{a3}$ and $D_{a4}$ conducts, depending on the direction of current.

TABLE II

| Voltage across phase B of AC | Device states (1---conduct, 0---do not conduct) | | |
|---|---|---|---|
| side 100 and M1 | Sb1 | Db1 | Db2 |
| Vc1 | 0 | 1 | 0 |
| 0 | 1 | 0 | 0 |
| −Vc2 | 0 | 0 | 1 |

| Voltage across phase B of AC | Device states (1---conduct, 0---do not conduct) | | |
|---|---|---|---|
| side 110 and M2 | Sb2 | Db3 | Db4 |
| Vc3 | 0 | 1 | 0 |
| 0 | 1 | 0 | 0 |
| −Vc4 | 0 | 0 | 1 |

During the control, gating signals of $S_{b1}$ and $S_{b2}$ are interleaved. If $S_{b1}$ is on, $D_{b1}$ and $D_{b2}$ are off. If $S_{b1}$ is off, one of $D_{b1}$ and $D_{b2}$ conducts, depending on the direction of current. If $S_{b2}$ is on, $D_{b3}$ and $D_{b4}$ are off. If $S_{b2}$ is off, one of $D_{b3}$ and $D_{b4}$ conducts, depending on the direction of current.

TABLE III

| Voltage across phase C of AC | Device states (1---conduct, 0---do not conduct) | | |
|---|---|---|---|
| side 100 and M1 | Sc1 | Dc1 | Dc2 |
| Vc1 | 0 | 1 | 0 |
| 0 | 1 | 0 | 0 |
| −Vc2 | 0 | 0 | 1 |

| Voltage across phase C of AC | Device states (1---conduct, 0---do not conduct) | | |
|---|---|---|---|
| side 110 and M2 | Sc2 | Dc3 | Dc4 |
| Vc3 | 0 | 1 | 0 |
| 0 | 1 | 0 | 0 |
| −Vc4 | 0 | 0 | 1 |

During the control, gating signals of Sa and Sa are interleaved. If $S_{c1}$ is on, $D_{c1}$ and $D_{c2}$ are off. If $S_{c1}$ is off, one of $D_{c1}$ and $D_{c2}$ conducts, depending on the direction of current. If $S_{c2}$ is on, $D_{c3}$ and $D_{c4}$ are off. If $S_{c2}$ is off, one of $D_{c3}$ and $D_{c4}$ conducts, depending on the direction of current. The number of the at least one choke 12 depends on how many phases the AC power source has which supplies AC current to the apparatus 1. In the embodiment of FIG. 1, the AC power source has three phases A, B, C, thus the number of the at least one choke 12 counts three. Namely, for each phase A, B, C, there is arranged a choke in the apparatus 1. Each of the three chokes has a first terminal 120, a second terminal 121 and at least one third terminal 122. The number of the at least one third terminal 122 is associated with how many second power conversion circuit 11 the apparatus 1 uses.

The first terminal 120 of each of the three chokes 12 is arranged to be electrically coupled to a phase of the AC power, and the second terminal 121 and the third terminal 122 are electrically coupled to respective same phases of the first AC side 100 of the first power conversion circuit 10 and the second AC side 110 of the second power conversion circuit 11. As shown in FIG. 1, with respect to phase-A of the AC power source, one of the chokes 12 has its first terminal 120 coupled to the phase-A of the AC power source, its second terminal 121 electrically coupled to phase-A of the first AC side 100 of the first power conversion circuit 10, and its third terminal 122 electrically coupled to phase-A of the second AC side 110 of the second power conversion circuit 11; with respect to phase-B of the AC power source, one of the chokes 12 has its first terminal 120 coupled to the phase-B of the AC power source, and its second terminal 121 electrically coupled to phase-B of the first AC side 100 of the first power conversion circuit 10 and its third terminal 122 electrically coupled to phase-B of the second AC side 110 of the second power conversion circuit 11; with respect to phase-C of the AC power source, one of the chokes 12 has its first terminal 120 is electrically coupled to the phase-C of the AC power source, its second terminal 121 electrically coupled to phase-C 110C of the first AC side 100 of the first power conversion circuit 10, and its third terminal 122 electrically coupled to phase-C of the second AC side 110 of the second power conversion circuit 11.

Each choke 12 includes a first common-mode choke $L_{CM}$ and a first differential-mode choke $L_{DM}$. The first common-mode chock $L_{CM}$ has a group of coils wound on a core, and the number of the coils depends on the number of the first power conversion circuit 10 and the second power conversion circuit 11. In this embodiment, the apparatus 1 has one first power conversion circuit 10 and one second power conversion circuit 11, and consequently the number of the coils counts two.

The first common-mode choke $L_{CM}$ and the first differential-mode choke $L_{DM}$ are electrically coupled in series via first ends 123 of the coils of the first common-mode choke $L_{CM}$ and first ends 124 of the coil of the first differential-mode choke $L_{DM}$.

Second ends 125 of the coils of the first common-mode choke $L_{CM}$ are electrically coupled to the first terminal 120 of the choke 12, and second ends 126 of the coils of the first differential-mode choke $L_{DM}$ are respectively electrically coupled to the second terminal 121 and the third terminal 122 of the choke 12. As an alternative, second ends of the coils of the first common-mode choke $L_{CM}$ are respectively electrically coupled to the second terminal 121 and the third terminal 122 of the choke 12 and second ends of the coils of the first differential-mode choke $L_{DM}$ are electrically coupled to the first terminal 120 of the choke 12. In summary, second coil ends of one of the first common-mode choke and the first differential-mode choke are electrically coupled to the first terminal of the choke, and second coil ends of the other are respectively electrically coupled to the second terminal and the at least one third terminal of the choke.

As a part of the choke 12 inserted between the AC power source and both of the first power conversion circuit 10 and the second power conversion circuit 11, the first common-mode choke $L_{CM}$ is useful for suppression of common-mode currents flowing to the apparatus 1 from the AC power source, while passing the differential-mode currents. The first differential-mode chock $L_{DM}$ has a group of coils wound on a core, and the number of the coils depends on the number of the first power conversion circuit 10 and the second power conversion circuit 11. In this embodiment, the apparatus 1 has one first power conversion circuit 10 and one second power conversion circuit 11, and consequently the number of the coils counts two. As a part of the choke 12 inserted between the AC power source and both of the first power conversion circuit 10 and the second power conversion circuit 11, the first differential-mode choke $L_{CM}$ is useful for suppression of differential-mode currents flowing within the apparatus 1, while passing the common-mode currents flowing from the AC power source.

Figure 2:
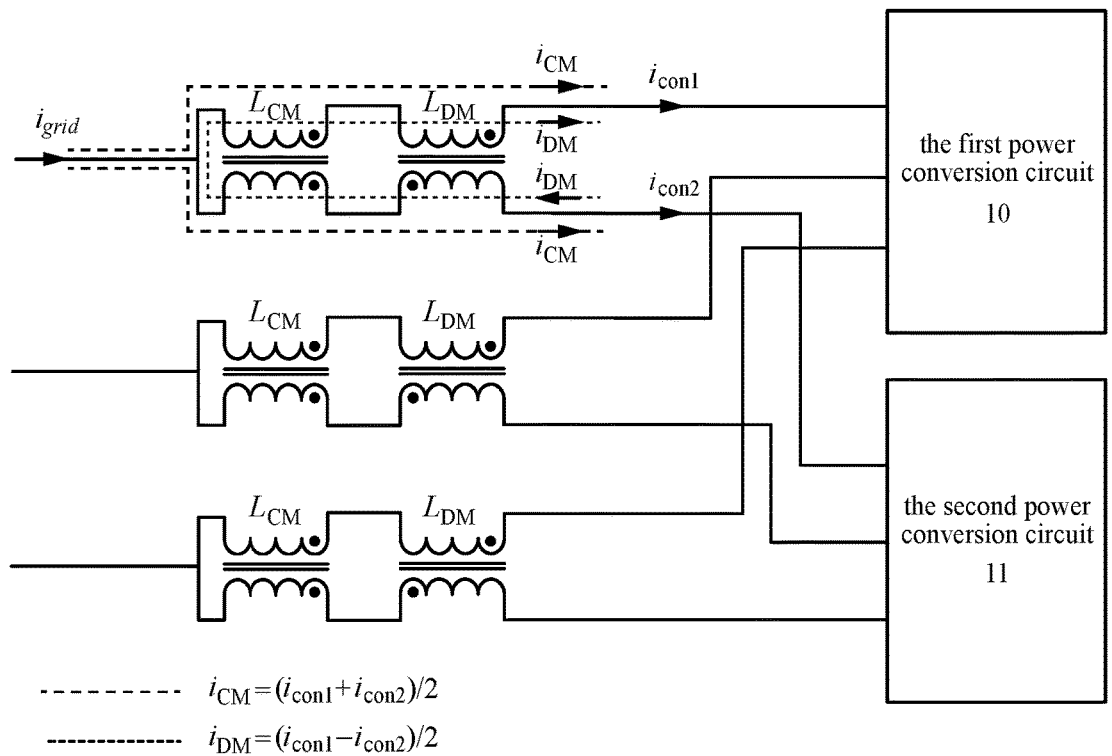
FIG. 2 illustrates phase current flow analysis of the choke according to an embodiment of present invention.

FIG. 2 illustrates phase current flow analysis of the choke according to an embodiment of present invention. The $i_{con1}$ and $i_{con2}$ are the currents of the two interleaved legs of the first power conversion circuit 10 and the second power conversion circuit 11 of one phase. For example, the leg consisting of diodes $D_{a1}$, $D_{a2}$ of the first power conversion circuit 10 and the leg consisting of diodes $D_{a3}$, $D_{a4}$ of the second power conversion circuit 11 are interleaved (phase A), the leg consisting of diodes $D_{b1}$, $D_{b2}$ of the first power conversion circuit 10 and the leg consisting of diodes $D_{b3}$, $D_{b4}$ of the second power conversion circuit 11 are interleaved (phase B), and the leg consisting of diodes $D_{c1}$, $D_{c2}$ of the first power conversion circuit 10 and the leg consisting of diodes $D_{c3}$, $D_{c4}$ of the second power conversion circuit 11 are interleaved (phase C).

The $i_{CM}$ is the CM (common-mode) current component in $i_{con1}$ and $i_{con2}$. The $i_{DM}$ is the DM (differential-mode) current component in $i_{con1}$ and $i_{con2}$. The $i_{DM}$ and $i_{DM}$ can be expressed as, $$i_{CM} = (i_{con1} + i_{con2})/2 \qquad (1)$$

$$i_{DM} = (i_{con1} - i_{con2})/2 \qquad (2)$$

With $i_{CM}$ and $i_{DM}$, the sub-converter currents $i_{con1}$ and $i_{con2}$ can be express as, $$i_{con1} = i_{CM} + i_{DM} \qquad (3)$$

$$i_{con2} = i_{CM} - i_{DM} \qquad (4)$$

It can be seen from (3)-(4) that $i_{con1}$ and $i_{con2}$ consist of CM and DM current components, $i_{CM}$ and $i_{DM}$.

$$i_{grid} = i_{con1} + i_{con2} = 2i_{CM} \qquad (5)$$

$$i_{cir} = (i_{con1} - i_{con2})/2 = i_{DM} \qquad (6)$$

It can be seen from (5)-(6) that, the CM current $i_{CM}$ flows to the grid and is the useful component for power conversion. The DM current $i_{DM}$ is the circulating current ($i_{cir}$) flowing between the sub-converters. It does not go to the AC power source and has no contribution to power conversion, but increasing current ripples and power losses in inductors, so the $i_{DM}$ is the undesired component.

In the topology according to present invention, $L_{CM}$ is used to filter the useful CM current (the current flowing from the AC power source) and its fundamental component is the useful component for power conversion, and $L_{DM}$ is used to suppress the undesired DM current (the circulating current).

The DM Choke ($L_{DM}$)

The $L_{DM}$ is an inductor with two windings coupled through one magnetic core in differential mode. The flux of CM current $i_{CM}$ of the two interleaved power conversion circuits cancel each other in $L_{DM}$, so the $L_{DM}$ does not provide inductance towards the CM current $i_{CM}$ except the leakage inductance.

The flux of DM current $i_{DM}$ of the two interleaved power conversion circuits enhance each other in $L_{DM}$ due to the flux coupling effect, and the inductance to the $i_{DM}$ is doubled compared with the design of using separate inductors. Therefore the circulating current is suppressed effectively. With the same requirement of circulating current, the inductance of the $L_{DM}$ can be smaller.

The CM Inductor ($L_{CM}$)

The $L_{CM}$ is an inductor with two windings coupled through one magnetic core in common mode. The flux of DM current $i_{DM}$ of the two interleaved power conversion circuits cancel each other in $L_{CM}$, so the $L_{CM}$ does not provide inductance towards the DM current $i_{DM}$ except the leakage inductance.

The flux of CM current $i_{CM}$ of the two interleaved power conversion circuits enhance each other in $L_{CM}$ due to the flux coupling effect, and the inductance to the $i_{CM}$ is doubled compared with the design of using separate inductors. The voltage across the $L_{CM}$ can be expressed as, $$u_{L_{CM}} = L\frac{di_{CON1}}{dt} + M\frac{di_{CON2}}{dt} \qquad (7)$$

Wherein the $u_{L_{CM}}$ is the voltage across the $L_{CM}$. L is the self-inductance of the first winding. M is the mutual inductance of the first and second windings of $L_{CM}$. Assuming the M=L, the following equation can be achieved, $$u_{L_{CM}} = L\frac{d(i_{CON1} + i_{CON2})}{dt} \qquad (8)$$

Substituting (5) into (8), the $u_{L_{CM}}$ can be expressed as, $$u_{L_{CM}} = L\frac{d(2i_{CM})}{dt} = L\frac{di_{grid}}{dt} \qquad (9)$$

As can be seen from (9), the effective inductance for filtering the grid current is L with the proposed topology. The effective value is doubled compared with the prior art design using separate inductors in which the effective inductance is only (L/2). In other words, the inductance size can be reduced by half by using the proposed technology compared with the prior art design for the same grid current requirement. The reduction in inductance helps to improve efficiency and reduce cost as well.

For the Common-Mode Current Component

By appropriately designing the inductance of the common-mode choke $L_{CM}$, the common-mode choke $L_{CM}$ provides high inductance to the high-frequency components of the common-mode current, which flows from the AC power source, since the impedance of the common-mode choke and the differential-mode choke depends on frequency on the same scale as inductance. The advantages of using the common-mode choke $L_{CM}$ is that it provides twice the inductance of separate inductor design due to the coupling effect. Therefore it filters the common-mode current more effectively or the inductance size can be reduced for a given current ripple requirement.

The differential-mode choke $L_{DM}$ gives no inductance towards the common-mode current due to the flux cancellation effect except the leakage inductance.

The common-mode choke $L_{CM}$, in principle, does not provide inductance towards the differential-mode current between the interleaved legs due to the flux cancellation effect. However, the leakage inductance and capacitance of $L_{CM}$ is acting in suppressing the differential-mode current between the interleaved legs together with the differential-mode choke $L_{DM}$. The leakage inductance and capacitance of the common-mode choke $L_{CM}$ help to reduce the undesired differential-mode current ripple and spikes.

For the Differential-Mode Current Component

Figure 3A:
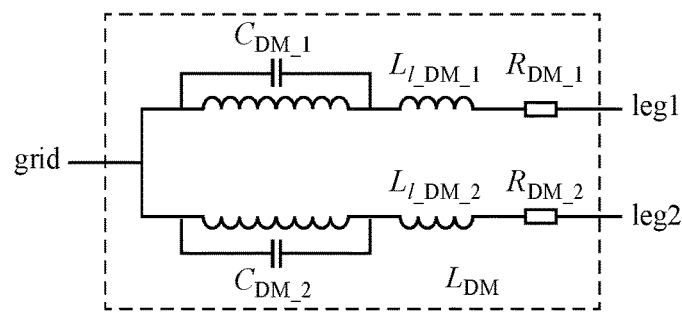
FIG. 3A illustrates a simplified high frequency equivalent circuit of using only differential-mode choke.

The differential-mode choke $L_{DM}$ provides inductance to undesired differential-mode current. The inductance is doubled compared with separate inductor design due to the coupling effect. Therefore it suppress the differential-mode current between the interleaved legs more effectively. FIG. 3A illustrates a simplified high frequency equivalent circuit of using only differential-mode choke. The total parasitic capacitance ($C_{DM\_only}$) and leakage inductance ($L_{l\_DM\_only}$) in this case are:

$$C_{DM\_only} = 1/(1/C_{DM\_1} + 1/C_{DM\_2}) \qquad (10)$$

$$L_{l\_DM\_only} = L_{l\_DM\_1} \pm L_{l\_DM\_2} \qquad (11)$$

The first common-mode choke $L_{CM}$ has a first parasitic capacitive element, and the first differential-mode choke $L_{DM}$ has a second parasitic capacitive element.

Figure 3B:
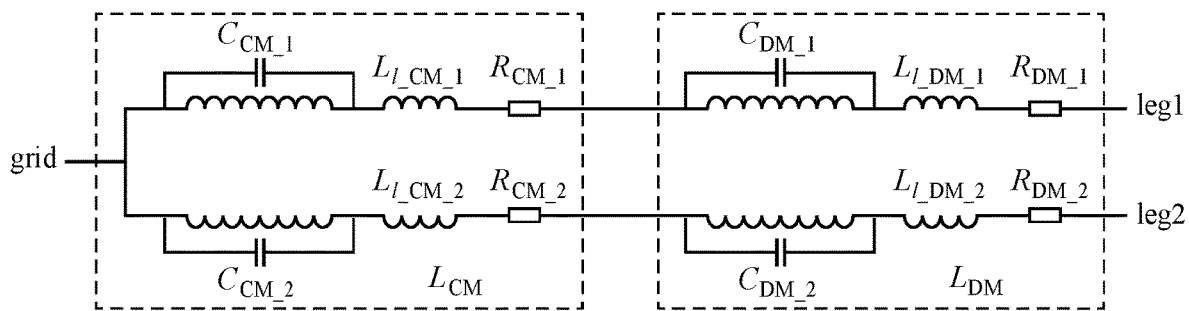
FIG. 3B shows the high frequency equivalent circuit of using common-mode choke and differential-mode choke according to an embodiment of present invention.

FIG. 3B shows the high frequency equivalent circuit of using common-mode choke and differential-mode choke according to an embodiment of present invention. The total parasitic capacitance ($C_{CM+DM}$) and leakage inductance ($L_{l\_CM+DM}$) in this case are, $$C_{CM+DM} = 1/(1/C_{CM\_1} + 1/C_{CM\_2} + 1/C_{DM\_1} + 1/C_{DM\_2}) < C_{DM\_only} \qquad (12)$$

$$L_{l\_CM+DM} = (L_{l\_CM\_1} + L_{l\_CM\_2} + L_{l\_DM\_1} \pm L_{l\_DM\_2}) > L_{l\_DM\_only} \qquad (13)$$

By using the combination of the common-mode choke $L_{CM}$ and the differential-mode choke $L_{DM}$, the following merits can be achieved:

The common-mode current at high frequency flowing to the AC power source is chocked and the undesired differential-mode current is choked.

Smaller inductances for both common-mode choke $L_{CM}$ and the differential-mode choke $L_{DM}$ are achieved due to the flux coupling effect.

The leakage inductance of the common-mode choke ($L_{l\_CM\_1}+L_{l\_CM\_2}$) can contribute to suppressing the differential-mode current together with the differential-mode choke $L_{DM}$, leading to smaller differential-mode current or smaller differential-mode choke for a given differential mode current.

The total parasitic capacitance $C_{CM+DM}$ (as shown in equation (12)) of the embodiment is smaller than the capacitance where an inductor is used instead. The total leakage inductance $L_{l\_CM+DM}$ (as shown in equation (13)) is larger than the leakage inductance where an inductor is used instead. The smaller parasitic capacitance and larger leakage inductance of the embodiment can lead to the reduction in current spikes when step voltage change occurs between the interleaved legs. The reduction in current spikes will contribute to better EMI performance.

Figure 4:
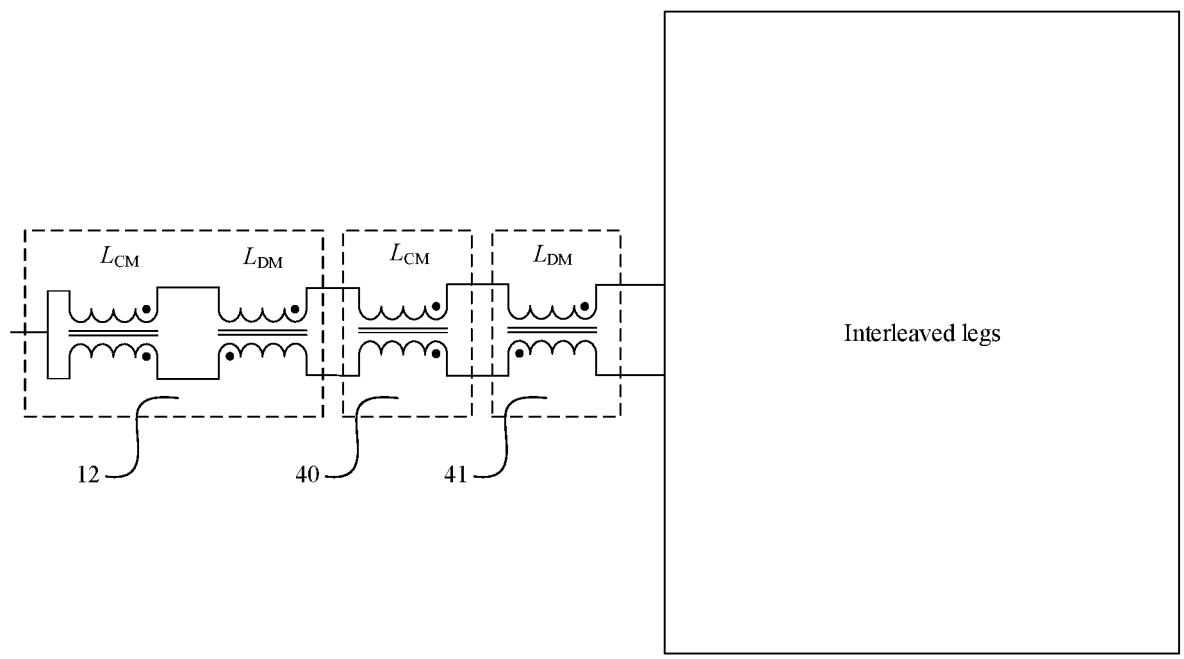
FIG. 4 illustrates an apparatus for conversion between AC power and DC power according to another embodiment of present invention.

FIG. 4 illustrates an apparatus for conversion between AC power and DC power according to another embodiment of present invention. As compared with the embodiment of FIGS. 1A and 1B, the choke 12 further includes at least one second common-mode choke 40 being electrically coupled to the first common-mode choke $L_{CM}$ and the first differential-mode choke $L_{DM}$ in series. Preferably, the choke 12 further includes at least one second differential-mode choke 41 being electrically coupled to the first common-mode choke $L_{CM}$ and the first differential-mode choke $L_{DM}$ in series.

Figure 5:
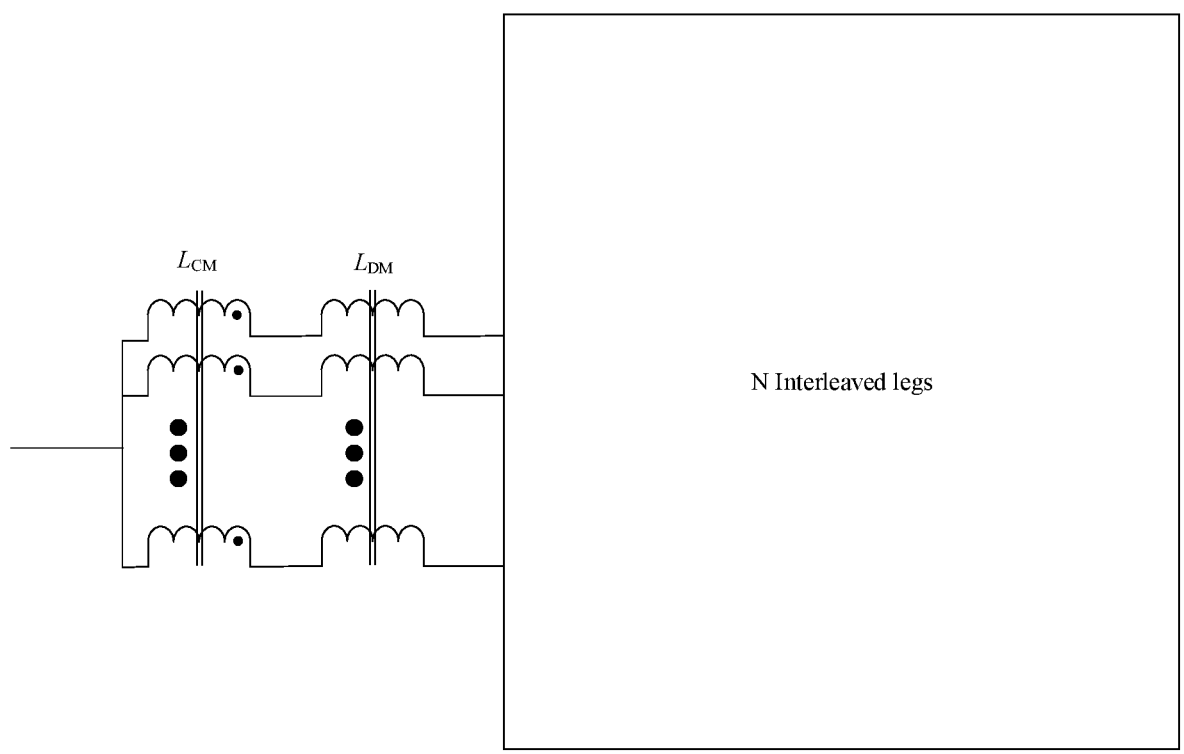
FIG. 5 illustrates an apparatus for conversion between AC power and DC power according to another embodiment of present invention.

FIG. 5 illustrates an apparatus for conversion between AC power and DC power according to another embodiment of present invention. As compared with the embodiment of FIG. 1 where for each of phases A, B, C, the apparatus 1 uses two interleaved legs of two power conversion circuits (the first power conversion circuit 10 and the second power conversion circuit 11), this embodiment for each phase has three or more interleaved legs of three or more power conversion circuits. For example, the number of the second power conversion circuit 11 counts two or more. Accordingly, the number of the third terminal of the choke 12 is two or more, the number of the coils 123 counts three or more, and the number of the coils 124 counts three or more. With, e.g., three or more legs the figure would translate to 6 or more diodes, respectively, and three or more bi-directional switches, respectively, etc. The greater the number of legs, the closer to samples of a sinusoid the switched voltage samples will be.

Figure 6A:
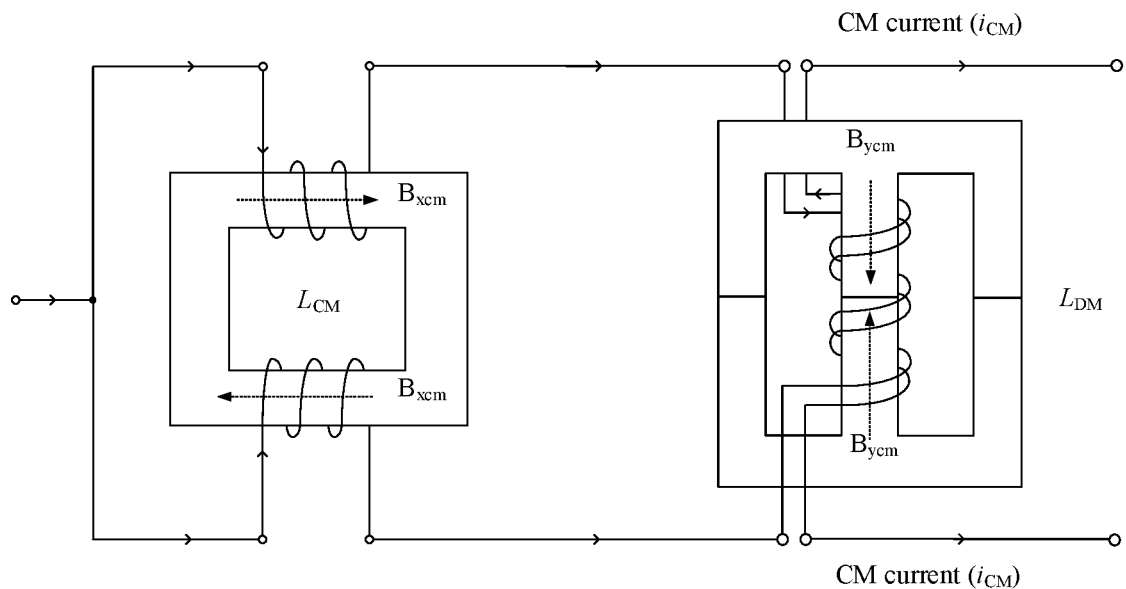
FIGS. 6A and 6B give a first example of the common-mode choke and the differential-mode choke.
Figure 6B:
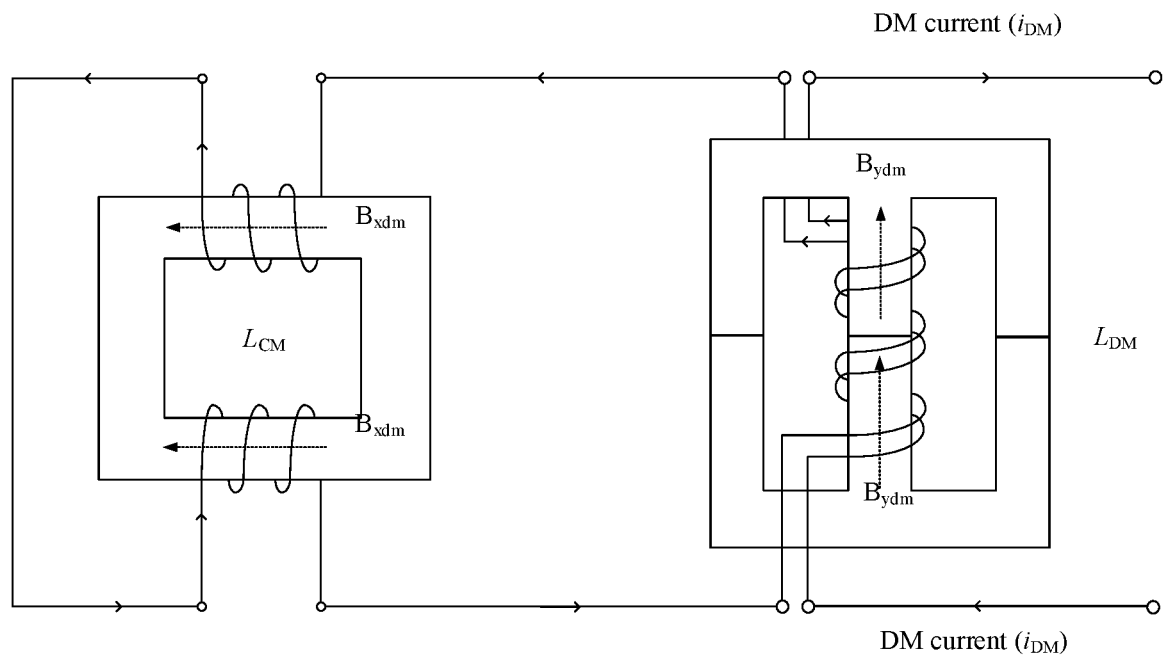

FIGS. 6A and 6B give a first example of the common-mode choke $L_{CM}$ and the differential-mode choke $L_{DM}$, as well as the flow of currents and fluxes in them. The two windings on the $L_{CM}$ have the same number of turns and are arranged in the way enhancing the flux generated by the Common-mode current and cancelling the flux generated by the Differential-mode current. The two windings on the $L_{DM}$ have the same number of turns and are arranged in the way cancelling the flux generated by the Common-mode current and enhancing the flux generated by the Differential-mode current. The flow of the Common-mode current ($i_{CM}$) and the corresponding fluxes are shown in FIG. 6A. The $B_{xcm}$, and $B_{ycm}$ denote the fluxes generated by the $i_{CM}$ in the $L_{CM}$ and $L_{DM}$ respectively. The $B_{xcm}$ enhance each other in the $L_{CM}$, while the $B_{ycm}$ cancel each other in the $L_{DM}$. The flow of the Differential-mode current ($i_{DM}$) and the corresponding fluxes are shown in FIG. 6B. The $B_{xdm}$ and $B_{ydm}$ denote the fluxes generated by the $i_{DM}$ in the $L_{CM}$ and $L_{DM}$ respectively.

The $B_{xdm}$ cancel each other in the $L_{CM}$, while the $B_{ydm}$ enhance each other in the $L_{DM}$. In other words, Common-mode current just generates flux in $L_{CM}$ and does not generate flux in $L_{DM}$ in theory if without considering leakage inductance. Differential-mode current just generates flux in $L_{DM}$ and does not generate flux in $L_{CM}$ in theory if without considering leakage inductance. So the $L_{CM}$ handles the Common-mode current (which is also the grid current), and the $L_{DM}$ handles the Differential-mode current (which is also the circulating current).

Figure 7A:
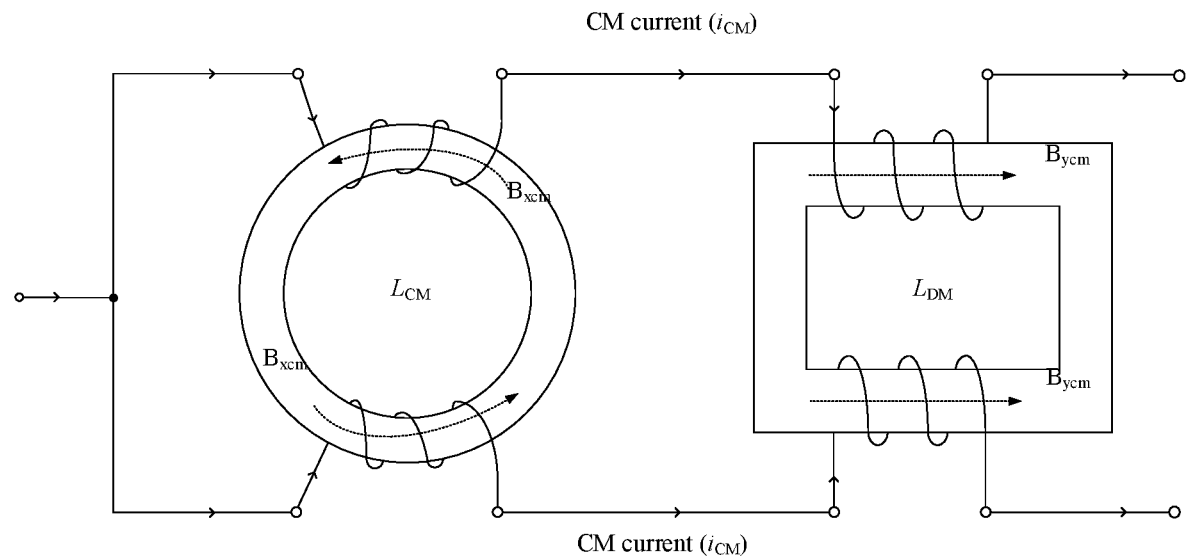
FIGS. 7A and 7B give another example of the common-mode choke and the differential-mode choke.
Figure 7B:
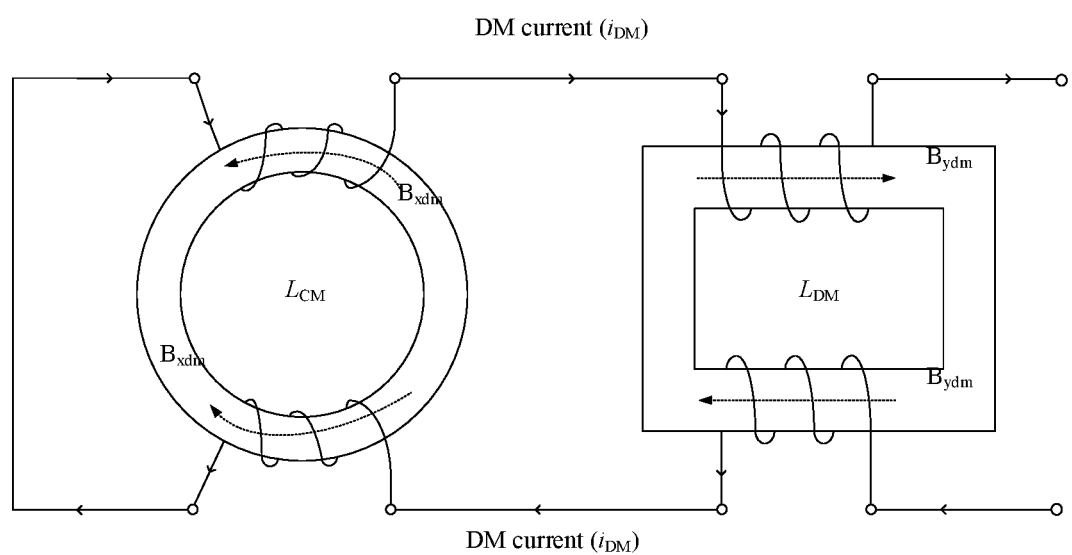

FIGS. 7A and 7B give another example of the $L_{CM}$ and $L_{DM}$ to show that the design of the $L_{CM}$ and $L_{DM}$ is very flexible and does not limit to a particular type. The current and flux analysis of the example in the FIGS. 7A and 7B is the same with the example in the FIGS. 6A and 6B, so it will not be repeated again.

The magnetic cores of the $L_{CM}$ and $L_{DM}$ could be the same or different, and do not limit to any certain material. For example, because $L_{DM}$ doesn't need to handle the grid current and the circulating current it handles is relatively small, ferrite that has the features of low power loss, high permeability and low saturation flux density could be used for $L_{DM}$ to achieve high inductance and low power loss. For $L_{CM}$, magnetic cores with relatively low permeability and high saturation flux density such as Fe—Si alloy could be used because the grid current it handles has relatively high current magnitude. The shape of the cores could be circular, rectangular, EI or double E, UU, PQ, and etc., and does not limit to any certain type for both $L_{CM}$ and $L_{DM}$, as shown in FIGS. 6A, 6B and FIGS. 7A, 7B.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. An apparatus for conversion between AC power and DC power, including:
    a first power conversion circuit having a first AC side and a first DC side;
    at least one second power conversion circuit each having a second AC side and a second DC side; and
    at least one choke having a first terminal, a second terminal and at least one third terminal, wherein the first terminal is arranged to be electrically coupled to a phase of the AC power, and the second terminal and the at least one third terminal are electrically coupled to respective same phases of the first AC side of the first power conversion circuit and the second AC side of the at least one second power conversion circuit;
    wherein:
    the choke includes:
        a first common-mode choke; and
        a first differential-mode choke;
    wherein:
        the first common-mode choke and the first differential-mode choke are electrically coupled in series via a first group of coil ends of the first common-mode choke and a first group of coil ends of the first differential-mode choke; and
        a second group of coil ends of one of the first common-mode choke and the first differential-mode choke are electrically coupled to the first terminal of the choke, and a second group of coil ends of the other are respectively electrically coupled to the second terminal and the at least one third terminal of the choke.

2. The apparatus according to claim 1, wherein:
the first power conversion circuit includes a first capacitor bank electrically coupled to the first DC side, having a pair of first capacitive elements electrically coupled in series at a first mid-point;
the at least one second power conversion circuit each includes a second capacitor bank electrically coupled to the second DC side, having a pair of second capacitive elements coupled in series at a second mid-point; and
the first mid-point and the at least one second mid-point are indirectly electrically coupled with each other.

3. The apparatus according to claim 2, further includes for each of the three phases:
a group of controllable bi-directional switches, one of which is inserted between the second terminal of the corresponding choke and the first mid-point of the first capacitor bank electrically connecting the same and the other of which each is inserted between the respective one of the at least one third terminal of the corresponding choke and the respective one of the at least one second mid-point of the second capacitor bank electrically connecting the same.

4. The apparatus according to claim 3, wherein:
the choke further includes:
at least one second common-mode choke, being electrically coupled to the first common-mode choke and the first differential-mode choke in series.

5. The apparatus according to claim 3, wherein:
the choke further includes:
at least one second differential-mode choke, being electrically coupled to the first common-mode choke and the first differential-mode choke in series.

6. The apparatus according to claim 3, wherein:
a number of the at least one second power conversion circuit counts one; and
a number of the at least one third terminal counts one.

7. The apparatus according to claim 3, wherein:
the first common-mode choke has a first parasitic capacitive element;
the first differential-mode choke has a second parasitic capacitive element.

8. The apparatus according to claim 7, wherein:
the first common-mode choke has a leakage flux.

9. The apparatus according to claim 1, wherein:
the first power conversion circuit has a topology of three-phase rectification circuit electrically coupled to its first AC side; and
the second power conversion circuit has a topology of three-phase rectification circuit electrically coupled to its second AC side.

10. The apparatus according to claim 1, wherein the choke further includes at least one second common-mode choke, being electrically coupled to the first common-mode choke and the first differential-mode choke in series.

11. The apparatus according to claim 2, wherein the choke further includes at least one second common-mode choke, being electrically coupled to the first common-mode choke and the first differential-mode choke in series.

12. The apparatus according to claim 1, wherein the choke further includes at least one second differential-mode choke, being electrically coupled to the first common-mode choke and the first differential-mode choke in series.

13. The apparatus according to claim 2, wherein the choke further includes at least one second differential-mode choke, being electrically coupled to the first common-mode choke and the first differential-mode choke in series.

14. The apparatus according to claim 1, wherein a number of the at least one second power conversion circuit counts one, and a number of the at least one third terminal counts one.

15. The apparatus according to claim 2, wherein a number of the at least one second power conversion circuit counts one, and a number of the at least one third terminal counts one.

16. The apparatus according to claim 1, wherein the first common-mode choke has a first parasitic capacitive element, and the first differential-mode choke has a second parasitic capacitive element.

17. The apparatus according to claim 16, wherein the first common-mode choke has a leakage flux.

18. The apparatus according to claim 2, wherein the first common-mode choke has a first parasitic capacitive element, and the first differential-mode choke has a second parasitic capacitive element.

19. The apparatus according to claim 18, wherein the first common-mode choke has a leakage flux.

20. The apparatus according to claim 3, wherein:
the first power conversion circuit has a topology of three-phase rectification circuit electrically coupled to its first AC side; and
the second power conversion circuit has a topology of three-phase rectification circuit electrically coupled to its second AC side.

* * * * *